United States Patent
Gray

(10) Patent No.: US 10,747,905 B2
(45) Date of Patent: Aug. 18, 2020

(54) ENCLAVE RING AND PAIR TOPOLOGIES

(71) Applicant: Microsoft Technology Licensing, LLC, Redmond, WA (US)

(72) Inventor: John Marley Gray, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 15/632,247

(22) Filed: Jun. 23, 2017

(65) Prior Publication Data
US 2018/0330125 A1    Nov. 15, 2018

Related U.S. Application Data

(60) Provisional application No. 62/505,038, filed on May 11, 2017.

(51) Int. Cl.
*G06F 21/72* (2013.01)
*H04L 9/08* (2006.01)
(Continued)

(52) U.S. Cl.
CPC .............. *G06F 21/72* (2013.01); *G06F 21/51* (2013.01); *G06F 21/53* (2013.01); *G06F 21/602* (2013.01);
(Continued)

(58) Field of Classification Search
CPC .......... G06F 21/12; G06F 21/53; G06F 21/74; G06F 21/121; G06F 21/123;
(Continued)

(56) References Cited

U.S. PATENT DOCUMENTS 6,295,361 B1   9/2001   Kadansky et al.
7,308,496 B2   12/2007   Yeager et al.
(Continued)

FOREIGN PATENT DOCUMENTS

WO    2008113425 A1    9/2008
WO    2013011263 A1    1/2013
(Continued)

OTHER PUBLICATIONS

"Blockchain as a Service", https://www.google.co.in/url?sa=t&rct=j&q=&esrc=s&source=web&cd=6&cad=rja&uact=8&ved=0ahUKEwjR_ba6mvHTAhUSSI8KHcoNDuQQFgg-MAU&url=https%3A%2F%2Fwww.cccinnovationcenter.com%2Fwp-content%Fuploads%2F2017%2F01%2FBlockchain-DCSummit.pptx&usg=AFQjCNENFpyVUP_Q7Aj6dung44x8EJQDCQ, Retrieved on: May 12, 2017, pp. 1-17.
(Continued)

*Primary Examiner* — Sher A Khan
(74) *Attorney, Agent, or Firm* — David Chin; Chin IP, PLLC

(57) ABSTRACT

In one example, a first enclave for use by a first counterparty to a smart contract is identified. A second enclave for use by a second counterparty to the smart contract may be identified. Secrets associated with the first counterparty to the first enclave may be caused to be securely provided. Secrets associated with the second counterparty to the second enclave may be caused to be securely provided. A cryptlet is caused to be provided to the first enclave. The cryptlet may be caused to be provided to the second enclave. A payload is received from the first enclave. A payload may be received from the second enclave. Validation may be caused to be performed for a plurality of payloads. The plurality of payloads may include the payload from the first enclave and the payload from the second enclave.

20 Claims, 6 Drawing Sheets

(51) Int. Cl.
| | |
|---|---|
| *H04L 9/14* | (2006.01) |
| *H04L 9/32* | (2006.01) |
| *H04L 29/06* | (2006.01) |
| *G06F 21/60* | (2013.01) |
| *G06F 21/74* | (2013.01) |
| *G06F 21/53* | (2013.01) |
| *G06F 21/51* | (2013.01) |
| *G06Q 20/06* | (2012.01) |

(52) U.S. Cl.
CPC ........... *G06F 21/74* (2013.01); *G06Q 20/065* (2013.01); *H04L 9/085* (2013.01); *H04L 9/0894* (2013.01); *H04L 9/14* (2013.01); *H04L 9/32* (2013.01); *H04L 9/3221* (2013.01); *H04L 9/3236* (2013.01); *H04L 9/3255* (2013.01); *H04L 63/12* (2013.01); *H04L 2209/38* (2013.01); *H04L 2209/56* (2013.01)

(58) Field of Classification Search
CPC ... G06F 21/125; G06F 21/126; H04L 9/0894; H04L 9/32; H04L 2209/38
See application file for complete search history.

(56) References Cited

U.S. PATENT DOCUMENTS

| | | | |
|---|---|---|---|
| 7,512,418 B2 | 3/2009 | Ara et al. | |
| 7,827,208 B2 | 11/2010 | Bosworth et al. | |
| 8,060,830 B2 | 11/2011 | Kahn et al. | |
| 8,122,031 B1 | 2/2012 | Mauro et al. | |
| 8,255,687 B1* | 8/2012 | Pelly | H04L 9/083 713/164 |
| 8,322,610 B2* | 12/2012 | Guthery | G06F 21/74 235/382 |
| 8,429,409 B1* | 4/2013 | Wall | G06Q 20/3226 713/172 |
| 8,615,656 B2 | 12/2013 | Weinstein et al. | |
| 8,875,228 B2* | 10/2014 | Gargiulo | H04L 9/32 726/1 |
| 8,996,530 B2 | 3/2015 | LuVogt et al. | |
| 9,319,220 B2 | 4/2016 | Grewal et al. | |
| 9,361,168 B1* | 6/2016 | Gantt | G06F 11/30 |
| 9,407,636 B2 | 8/2016 | Scarlata et al. | |
| 9,436,812 B2 | 9/2016 | Chhabra et al. | |
| 9,450,298 B2 | 9/2016 | Lee | |
| 9,569,771 B2 | 2/2017 | Lesavich et al. | |
| 9,584,517 B1* | 2/2017 | Roth | H04L 63/10 |
| 9,660,970 B1 | 5/2017 | Rubin et al. | |
| 2002/0152044 A1 | 10/2002 | Shanks et al. | |
| 2002/0158775 A1 | 10/2002 | Wallace | |
| 2003/0063742 A1 | 4/2003 | Neufeld et al. | |
| 2003/0233538 A1 | 12/2003 | Dutertre | |
| 2004/0120528 A1 | 6/2004 | Elliott et al. | |
| 2006/0149962 A1 | 7/2006 | Fountain et al. | |
| 2007/0078857 A1 | 4/2007 | Punaganti et al. | |
| 2009/0006974 A1 | 1/2009 | Harinarayan et al. | |
| 2009/0215408 A1 | 8/2009 | Evers et al. | |
| 2010/0069772 A1 | 3/2010 | Henke et al. | |
| 2010/0332583 A1* | 12/2010 | Szabo | G06F 21/6245 709/202 |
| 2011/0003610 A1 | 1/2011 | Key et al. | |
| 2011/0035581 A1* | 2/2011 | Maller | G06Q 10/10 713/152 |
| 2012/0159184 A1 | 6/2012 | Johnson et al. | |
| 2012/0278628 A1* | 11/2012 | Chen | G06F 21/6254 713/176 |
| 2013/0099918 A1 | 4/2013 | Dunst et al. | |
| 2013/0254290 A1 | 9/2013 | Grossman | |
| 2014/0223193 A1* | 8/2014 | Sakumoto | H04L 9/3252 713/189 |
| 2014/0317686 A1 | 10/2014 | Vetillard | |
| 2014/0365507 A1 | 12/2014 | Wissner et al. | |
| 2015/0112918 A1 | 4/2015 | Zheng et al. | |
| 2015/0262069 A1 | 9/2015 | Gabriel et al. | |
| 2015/0310424 A1 | 10/2015 | Myers | |
| 2015/0347768 A1 | 12/2015 | Martin et al. | |
| 2015/0356524 A1 | 12/2015 | Pennanen | |
| 2015/0363280 A1 | 12/2015 | Yeager et al. | |
| 2015/0372811 A1 | 12/2015 | Le Saint et al. | |
| 2016/0006754 A1 | 1/2016 | Woodward et al. | |
| 2016/0036826 A1 | 2/2016 | Pogorelik et al. | |
| 2016/0086175 A1 | 3/2016 | Finlow-bates et al. | |
| 2016/0092988 A1* | 3/2016 | Letourneau | G06Q 40/06 705/66 |
| 2016/0098730 A1 | 4/2016 | Feeney | |
| 2016/0171248 A1 | 6/2016 | Nesher et al. | |
| 2016/0191513 A1* | 6/2016 | Tomlinson | H04L 9/321 |
| 2016/0260169 A1 | 9/2016 | Arnold et al. | |
| 2016/0261409 A1* | 9/2016 | French | H04L 9/00 |
| 2016/0261690 A1 | 9/2016 | Ford | |
| 2016/0275461 A1* | 9/2016 | Sprague | G06Q 20/0655 |
| 2016/0292672 A1 | 10/2016 | Fay et al. | |
| 2016/0321654 A1 | 11/2016 | Lesavich et al. | |
| 2016/0330034 A1* | 11/2016 | Back | G06Q 20/06 |
| 2016/0350534 A1 | 12/2016 | Poornachandran et al. | |
| 2017/0000390 A1 | 1/2017 | Biederman et al. | |
| 2017/0006003 A1 | 1/2017 | Lakaria et al. | |
| 2017/0048217 A1 | 2/2017 | Biggs et al. | |
| 2017/0111175 A1 | 4/2017 | Oberhauser et al. | |
| 2017/0177457 A1 | 6/2017 | Swanson et al. | |
| 2017/0220781 A1* | 8/2017 | Odom | G06Q 30/0207 |
| 2017/0230182 A1 | 8/2017 | Misoczki et al. | |
| 2017/0286820 A1 | 10/2017 | Nikunen et al. | |
| 2017/0295180 A1* | 10/2017 | Day | G07C 9/00309 |
| 2018/0032383 A1 | 2/2018 | Surcouf et al. | |
| 2018/0085605 A1 | 3/2018 | Maharbiz et al. | |
| 2018/0095899 A1 | 4/2018 | Durham et al. | |
| 2018/0096137 A1 | 4/2018 | Trostle et al. | |
| 2018/0114012 A1 | 4/2018 | Sood et al. | |
| 2018/0137299 A1 | 5/2018 | Porter et al. | |
| 2018/0145836 A1 | 5/2018 | Saur et al. | |
| 2018/0191501 A1* | 7/2018 | Lindemann | H04L 9/3231 |
| 2018/0227128 A1 | 8/2018 | Church et al. | |
| 2018/0232517 A1 | 8/2018 | Roth et al. | |
| 2019/0034917 A1 | 1/2019 | Nolan et al. | |
| 2019/0034919 A1 | 1/2019 | Nolan et al. | |
| 2019/0034920 A1 | 1/2019 | Nolan et al. | |
| 2019/0034936 A1 | 1/2019 | Nolan et al. | |
| 2019/0035018 A1 | 1/2019 | Nolan et al. | |
| 2019/0089537 A1 | 3/2019 | Gray | |
| 2019/0116174 A1 | 4/2019 | Gray | |
| 2020/0089872 A1 | 3/2020 | Gray | |

FOREIGN PATENT DOCUMENTS

| | | |
|---|---|---|
| WO | 2014105914 A1 | 7/2014 |
| WO | 2016020465 A1 | 2/2016 |
| WO | 2017007725 A1 | 1/2017 |
| WO | 2018090012 A1 | 5/2018 |

OTHER PUBLICATIONS

"Intel Software Guard Extensions", https://download.01.org/intel-sgx/linux-1.5/docs/Intel_SGX_Developer_Guide.pdf, Retrieved on: Mar. 27, 2017, 34 pages.

"iOS_Security_iOS_10_Mar2017", In White Paper of iOS Security, Mar. 2017, pp. 1-68.

"Tendermint Added to Azure", http://www.coindesk.com/press-releases/tendermint-added-to-azure/, Published on: Mar. 18, 2016, 2 pages.

"Thoughts on UTXOs by Vitalik Buterin", https://medium.com/@ConsenSys/thoughts-on-utxo-by-vitalik-buterin-2bb782c67e53, Published on: Mar. 9, 2016, 5 pages.

"Working with the Secure Enclave", https://developer.apple.com/library/content/documentation/Security/Conceptual/CertKeyTrustProgGuide/SecureKeyGen.html, Retrieved on: May 17, 2017, 3 pages.

Beekman, Jethro Gideon, "Improving Cloud Security using Secure Enclaves", In Technical Report No. UCB/EECS-2016-219, Dec. 22, 2016, 72 pages.

(56) References Cited

OTHER PUBLICATIONS

Betts, Beth, "Anatomy of a Smart Contract", https://blockchain-expo.com/2017/02/featured/anatomy-smart-contract/, Published on: Feb. 14, 2017, 12 pages.
Croman, et al., "On Scaling Decentralized Blockchain", In Proceedings of International Conference on Financial Cryptography and Data Security, Feb. 2016, 16 pages.
Gray, et al., "Azure/azure-blockchain-projects", https://github.com/Azure/azure-blockchain-projects/blob/master/bletchley/CryptletsDeepDive.md, Published on: Nov. 10, 2016, 18 pages.
Gray, John Marley; "Cryptlet Identity"; U.S. Appl. No. 15/592,928, filed May 11, 2017; 44 pages.
Gray, John Marley; "Cryptlet Smart Contract"; U.S. Appl. No. 15/593,001, filed May 11, 2017; 47 pages.
Gray, John Marley; "Enclave Pool Management"; U.S. Appl. No. 15/592,867, filed May 11, 2017; 47 pages.
Gray, John Marley; "Enclave Pool Shared Key"; U.S. Appl. No. 15/592,802, filed May 11, 2017; 41 pages.
Gray, John Marley; "Enclave Pools"; U.S. Appl. No. 15/592,750, filed May 11, 2017; 37 pages.
Gray, John Marley; "Secure Cryptlet Tunnel"; U.S. Appl. No. 15/592,697, filed May 11, 2017; 41 pages.
Lohstroh, Marten, "Nov. 3: SGX", In Publication of Security in Computer Systems, 2015, 6 pages.
Nagpal, Praveen, "Developing Smart Contracts Using Solidity", http://www.chainthat.com/updates/2017/1/4/developing-smart-contracts-using-solidity, Published on: May 30, 2016, 3 pages.
Ojha, Varun, "Writing Blockchain chaincode in Go for Hyperledger Fabric v0.6", http://www.ibm.com/developerworks/cloud/library/cl-ibm-blockchain-chaincode-development-using-golang/index.html, Published on: Mar. 1, 2017, 14 pages.
Tandulwadikar, Akhil, "Blockchain in Banking: A Measured Approach", In White Paper of Cognizant, Apr. 2016, pp. 1-10.
Wood, Gavin, "Ethereum: A Secure Decentralised Generalised Transaction Ledger Final Draft—Under Review", https://bravenewcoin.com/assets/Whitepapers/Ethereum-A-Secure-Decentralised-Generalised-Transaction-Ledger-Yellow-Paper.pdf, Published on: Aug. 6, 2015, pp. 1-29.
Gray, Marley, "Bletchley—The Cryptlet Fabric & Evolution of blockchain Smart Contracts", http://www.dataarchitect.cloud/bletchley-the-cryptlet-fabric-evolution-of-blockchain-smart-contracts/, Published on: Feb. 9, 2017, 18 pages.
Gray, et al., "#Project Bletchley—The Cryptlet Fabric ##Cryptlets in Depth", https://github.com/Azure/azure-blockchain-projects/blob/master/bletchley/CryptletsDeepDive.md, Published on: Nov. 10, 2016, 18 pages.
Watanabe, et al., "Blockchain Contract: A Complete Consensus using Blockchain", In Proceedings of IEEE 4th Global Conference on Consumer Electronics, Oct. 27, 2015, pp. 577-578.
Kosba, et al., "Hawk: The Blockchain Model of Cryptography and Privacy-Preserving Smart Contracts", In Proceedings of IEEE Symposium on Security and Privacy, May 22, 2016, pp. 1-32.
Gidney, Kevin, "Intelligent Contracts—Is This the Way Forward for Enterprises?", http://www.corpcounsel.com/id=1202774474477/Intelligent-ContractsIs-This-the-Way-Forward-for-Enterprises-?slreturn=20170228221950, Published on: Dec. 12, 2016, 7 pages.
Lind, et al., "Teechan: Payment Channels Using Trusted Execution Environments", In Journal of Computing Research Repository, Dec. 2016, pp. 1-14.
"Non Final Office Action Issued in U.S. Appl. No. 15/592,697", dated Dec. 26, 2018, 32 Pages.
"Best 25+ Ideas about Appetizers", Retrieved from: https://www.bing.com/discover/appetizers, Apr. 27, 2017, 4 Pages.
"Bing Image Feed", Retrieved from: https://www.bing.com/images/discover?FORM=ILPMFT, Apr. 27, 2017, 2 Pages.
"Final Office Action Issued in U.S. Appl. No. 15/624,584", dated Jul. 31, 2018, 19 Pages.
"Non Final Office Action Issued in U.S. Appl. No. 15/624,584", dated Jan. 26, 2018, 17 Pages.
"Provisional Application Filed in U.S. Appl. No. 62/505,038", filed May 11, 2017, 47 pages.
Gray, Marley, "Introducing Project "Bletchley"—Microsoft's Blockchain Architecture Overview Whitepaper", Retrieved from: https://github.com/Azure/azure-blockchain-projects/blob/master/bletchley/AnatomyofASmartContract.md, Apr. 9, 2017, 12 Pages.
Gray, Marley, "Anatomy of A Smart Contract. md at master", Retrieved from: https://github.com/Azure/azure-blockchain-projects/blob/master/bletchley/AnatomyofASmartContract.md, Apr. 17, 2017, 5 Pages.
Ma, Michelle, "No-power Wi-Fi connectivity could fuel Internet of Things reality", Retrieved from: http://www.washington.edu/news/2014/08/04/no-power-wi-fi-connectivity-could-fuel-internet-of-things-reality/, Aug. 4, 2014, 9 Pages.
"International Search Report & Written Opinion for PCT Patent Application No. PCT/US18/027001", dated Jun. 15, 2018, 11 Pages.
"International Search Report & Written Opinion for PCT Patent Application No. PCT/US18/027201", dated Jul. 6, 2018, 11 Pages.
"International Search Report & Written Opinion for PCT Patent Application No. PCT/US18/027203", dated Jul. 12, 2018, 11 Pages.
"International Search Report & Written Opinion for PCT Patent Application No. PCT/US18/027208", dated Jul. 6, 2018, 12 Pages.
"International Search Report & Written Opinion for PCT Patent Application No. PCT/US18/027210", dated Jul. 10, 2018, 13 Pages.
"International Search Report & Written Opinion for PCT Patent Application No. PCT/US18/027211", dated Jul. 24, 2018, 13 Pages.
"International Search Report & Written Opinion for PCT Patent Application No. PCT/US18/028227", dated Jul. 2, 2018, 11 Pages.
Smith, Joshua R., "WISP( Wireless Identification and Sensing Platform)", Retrieved from: http://sensor.cs.washington.edu/WISP.html, Apr. 27, 2017, 2 Pages.
Zhang, Fan, et al., "Town Crier: An Authenticated Data Feed for Smart Contracts", In International Association for Cryptologic Research, Feb. 19, 2016, 23 Pages.
"Non Final Office Action Issued in U.S. Appl. No. 15/592,750", dated Mar. 19, 2019, 16 Pages.
"Non Final Office Action Issued in U.S. Appl. No. 15/592,802", dated Apr. 8, 2019, 10 Pages.
"Non Final Office Action Issued in U.S. Appl. No. 15/592,867", dated Mar. 21, 2019, 22 Pages.
Tramer, et al., "Sealed-Glass Proofs: Using Transparent Enclaves to Prove and Sell Knowledge", In Proceeding of IEEE European Symposium on Security and Privacy, Apr. 26, 2017, pp. 19-34.
"Notice of Allowance Issued in U.S. Appl. No. 15/592,928", dated May 20, 2019, 14 Pages.
"Non Final Office Action Issued in U.S. Appl. No. 15/592,697", dated Jul. 11, 2019, 31 Pages.
"Notice of Allowance Issued in U.S. Appl. No. 15/592,750", dated Aug. 9, 2019, 11 Pages.
"Non Final Office Action Issued in U.S. Appl. No. 15/592,867", dated Jan. 7, 2020, 11 Pages.
"Final Office Action Issued in U.S. Appl. No. 15/593,001", dated Jan. 27, 2020, 20 Pages.
"Non Final Office Action Issued in U.S. Appl. No. 15/593,001", dated Aug. 16, 2019, 19 Pages.
"Final Office Action Issued in U.S. Appl. No. 15/592,867", dated Oct. 11, 2019, 20 Pages.
"Final Office Action Issued in U.S. Appl. No. 15/592,697", dated Nov. 13, 2019, 31 Pages.

* cited by examiner

ENCLAVE RING AND PAIR TOPOLOGIES

CROSS-REFERENCE TO RELATED APPLICATION(S)

This application claims the benefit of U.S. Provisional Application No. 62/505,038, filed May 11, 2017. The entirety of this aforementioned application is incorporated herein by reference.

BACKGROUND

Blockchain systems have been proposed for a variety of application scenarios, including applications in the financial industry, health care, IoT, and so forth. For example, the Bitcoin system was developed to allow electronic cash to be transferred directly from one party to another without going through a financial institution. A bitcoin (e.g., an electronic coin) is represented by a chain of transactions that transfers ownership from one party to another party. To transfer ownership of a bitcoin, a new transaction may be generated and added to a stack of transactions in a block. The new transaction, which includes the public key of the new owner, may be digitally signed by the owner with the owner's private key to transfer ownership to the new owner as represented by the new owner public key.

Once the block is full, the block may be "capped" with a block header that is a hash digest of all the transaction identifiers within the block. The block header may be recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain may create a mathematical proof of ownership in an entity represented by a security identity (e.g., a public key), which in the case of the bitcoin system is pseudo-anonymous.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to secure transactions. In one example of the technology, a first enclave for use by a first counterparty to a smart contract is identified. A second enclave for use by a second counterparty to the smart contract may be identified. Secrets associated with the first counterparty to the first enclave may be caused to be securely provided. Secrets associated with the second counterparty to the second enclave may be caused to be securely provided. A cryptlet is caused to be provided to the first enclave. The cryptlet may be caused to be provided to the second enclave. A payload is received from the first enclave. A payload may be received from the second enclave. Validation may be caused to be performed for a plurality of payloads. The plurality of payloads may include the payload from the first enclave and the payload from the second enclave.

Cryptlets may be installed and registered by the cryptlet fabric. Cryptlets may perform advanced, proprietary, private execution with secrets kept from counterparties, such as private keys or different variable values for counterparties that should not be shared, e.g., terms and prices. In this case, more than one instance of a cryptlet may be used in order to keep secrets (keys, terms) in separate secure address spaces, to provide isolation, and for privacy encryption schemes like ring or threshold encryption schemes for storing shared secrets on the blockchain. In some examples, cryptlets each running the same logic in a separate enclave that are hosting secrets for a single counterparty in a multi-counterparty smart contract runs in a pair for two counterparties or a ring with more than two counterparties. In some examples, the cryptlets running in a pair or a ring perform the same execution logic, with different cryptographic keys for signing or secret parameters not shared with others.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
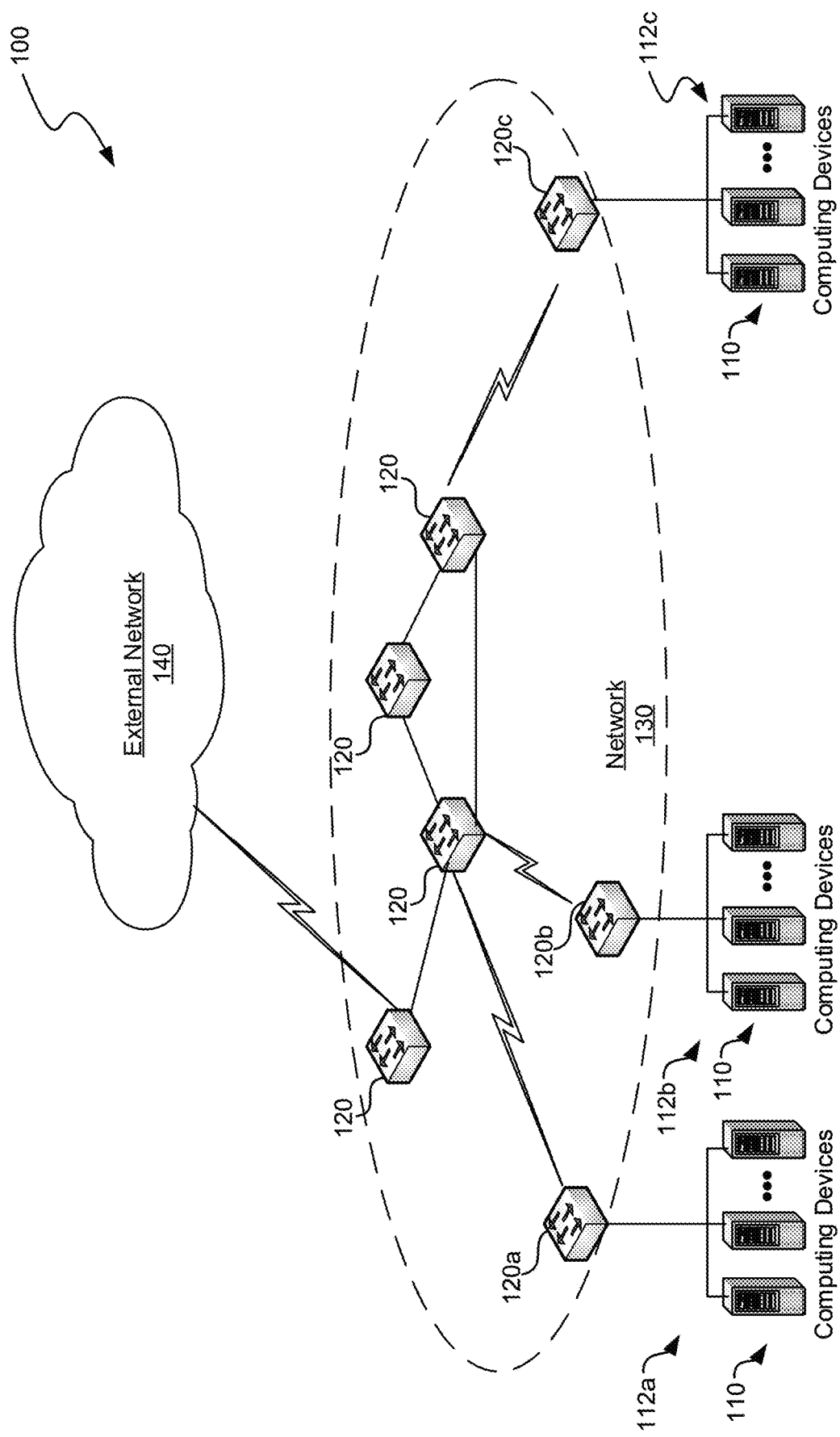
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to secure transactions. In one example of the technology, a first enclave for use by a first counterparty to a smart contract is identified. A second enclave for use by a second counterparty to the smart contract is identified. Secrets associated with the first counterparty to the first enclave are caused to be securely provided. Secrets associated with the second counterparty to the second enclave are caused to be securely provided. A cryptlet is caused to be provided to the first enclave. The cryptlet is caused to be provided to the second enclave. A payload is received from the first enclave. A payload is received from the second enclave. Validation is caused to be performed for a plurality of payloads. The plurality of payloads includes the payload from the first enclave and the payload from the second enclave.

In some examples, a cryptlet is a code component that can execute in a secure environment and be communicated with using secure channels. One application for cryptlets is smart contracts. In some examples, a smart contract is computer code that partially or fully executes and partially or fully enforces an agreement or transaction, such as an exchange of money and/or property, and which may make use of blockchain technology. Rather than running the logic of a smart contract in the blockchain itself, in some examples, the logic may instead be done by cryptlets executing off of the blockchain. In some examples, the blockchain may still be involved in some manner, such as in tracking the state, and receiving the output of the cryptlet.

Some or all of the cryptlet code may be associated with a constraint to execute in a secure environment. Accordingly, some of the cryptlet code may be run in an enclave. In some examples, an enclave is an execution environment, provided by hardware or software, that is private, tamper resistant, and secure from external interference. In some examples, outputs from the cryptlet code are signed by at least the host enclave's private enclave key of an enclave key pair stored by the host enclave.

Cryptlets may be installed and registered by the cryptlet fabric. Cryptlets may perform advanced, proprietary, private execution with secrets kept from counterparties, such as private keys or different variable values for counterparties that should not be shared, e.g., terms and prices. In this case, more than one instance of a cryptlet may be used in order to keep secrets (keys, terms) in separate secure address spaces, to provide isolation, and for privacy encryption schemes like ring or threshold encryption schemes for storing shared secrets on the blockchain.

In some examples, cryptlets each running the same logic in a separate enclave that are hosting secrets for a single counterparty in a multi-counterparty smart contract runs in a pair for two counterparties or a ring with more than two counterparties. In some examples, the cryptlets running in a pair or a ring perform the same execution logic, with different cryptographic keys for signing or secret parameters not shared with others.

In some examples, cryptlets in one of these configurations participate in simple consensus processes with a witness providing validation, such as Paxos, a simple 100% match between pairs, and/or the like.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices no shown in FIG. 1 may be in various locations, including on premise, in the cloud, or the like. For example, computer devices no may be on the client side, on the server side, or the like.

As shown in FIG. 1, network 130 can include one or more network nodes 120 that interconnect multiple computing devices 110, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices no are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120C can then be operatively coupled to additional network nodes 120 to form a computer network in a hierarchical, flat, mesh, or other suitable types of topology that allows communications between computing devices 110 and external network 140. In other examples, multiple host sets 112a-112C may share a single network node 120. Computing devices no may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a device that comprises part or all of an IoT support service, a device comprising part or all of an application back-end, or the like, as discussed in greater detail below.

Illustrative Computing Device

Figure 2:
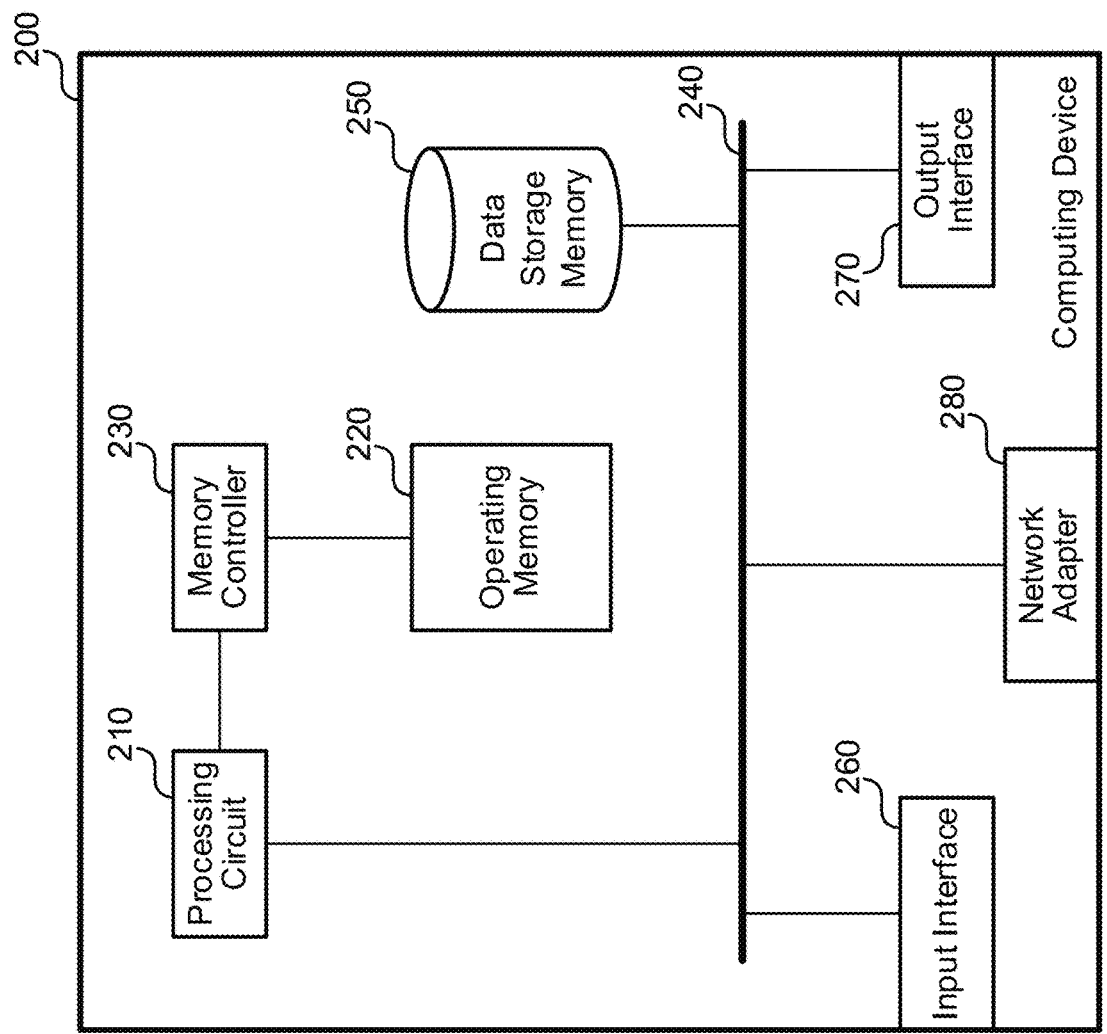
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
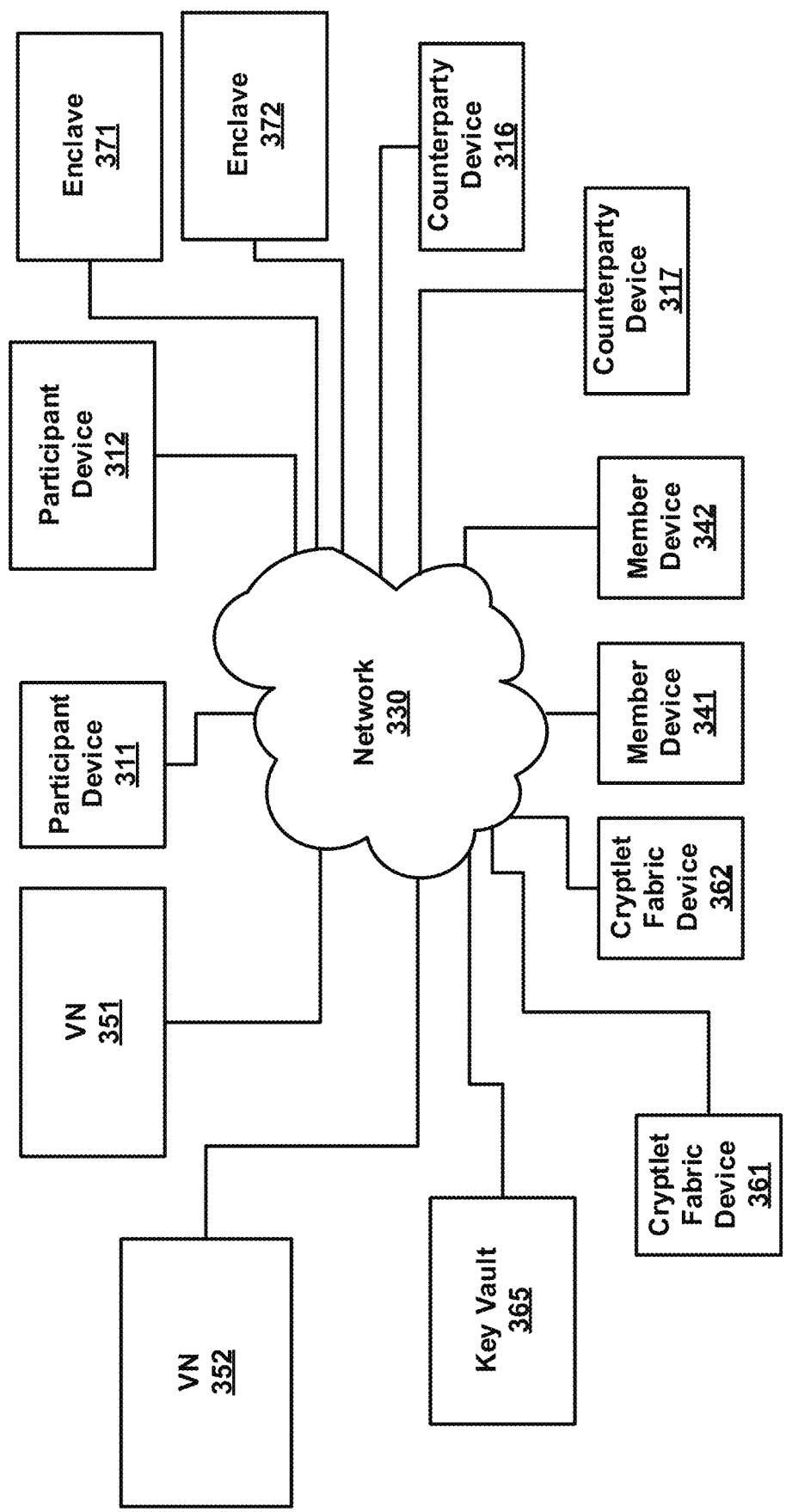
FIG. 3 is a block diagram illustrating an example of a system.

FIG. 3 is a block diagram illustrating an example of a system (300). System 300 may include network 330, as well as participant devices 311 and 312, member devices 341 and 342, counterparty devices 316 and 317, validation nodes (VNs) 351 and 352, enclaves 371 and 372, cryptlet fabric devices 361 and 362, and key vault 365, which all may connect to network 330.

Each of the participant devices 311 and 312, counterparty devices 316 and 317, member devices 341 and 342, VNs 351 and 352, cryptlet fabric devices 361 and 362, and/or key vault 365 may include examples of computing device 200 of FIG. 2. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some IoT devices may be connected to a user device via a different network in network 330 than other IoT devices. In essence, network 330 includes any communication technology by which information may travel between participant devices 311 and 312, counterparty devices 316 and 317, member devices 341 and 342, VNs 351 and 352, cryptlet fabric devices 361 and 362, enclaves 371 and 372, and/or key vault 365. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

In some examples, VNs 351 and VN 352 are part of a blockchain network. In some examples, VNs 351 and 352 are devices that, during normal operation, validate and process submitted blockchain transactions, and execute chaincode. In some examples, member devices 341 and 342 are devices used by members to communicate over network 330, such as for communication between a member and its corresponding VN, for example to endorse a VN. In some examples, participant devices 311 and 312 are devices used by participants to communicate over network 330, such as to request a transaction.

In some examples, counterparty devices 316 and 317 are devices used by counterparties or as counterparties to a smart contract that makes use of a contract cryptlet via the cryptlet fabric (where the cryptlet fabric includes, e.g., cryptlet fabric device 361 and cryptlet fabric device 362). Counterparty devices 316 and 317 may each be, represent, and/or act on behalf of a person, company, IoT device, smart contract, and/or the like.

An example arrangement of system 300 may be described as follows. In some examples, enclaves 371 and 372 are execution environments, provided by hardware or software, that are private, tamper resistant, and secure from external interference. Outputs from an enclave are digitally signed by the enclave. Cryptlet fabric devices 361 and 362 are part of a cryptlet fabric that provides runtime and other functionality for cryptlets, as discussed in greater detail below. Key vault 365 may be used to provide secure persistent storage for keys used by cryptlets for identity, digital signature, and encryption services.

System 300 may include more or less devices than illustrated in FIG. 3, which is shown by way of example only.

Illustrative Device

Figure 4:
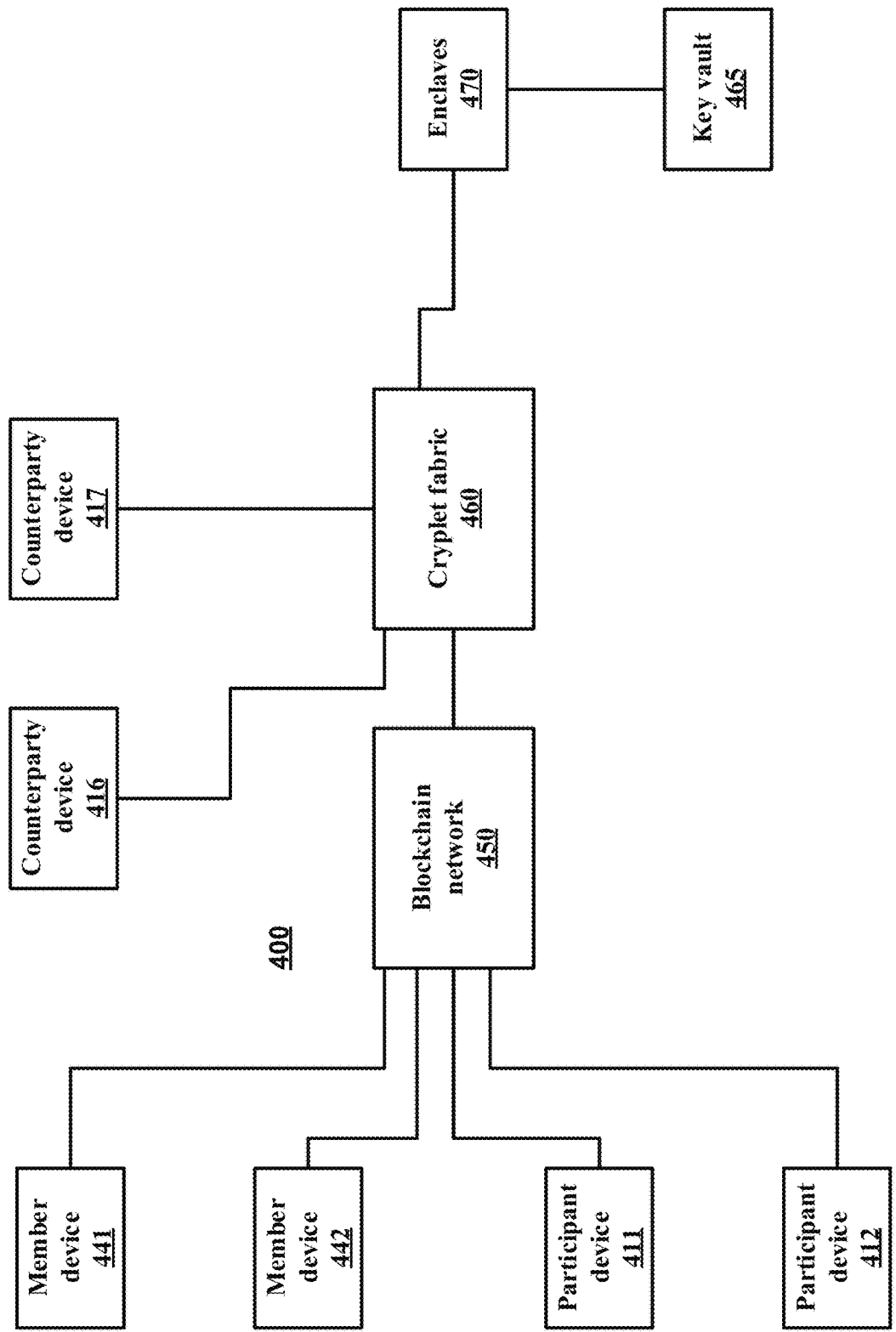
FIG. 4 is a block diagram illustrating an example of the system of FIG. 3.

FIG. 4 is a block diagram illustrating an example of system 400, which may be employed as an example of system 300 of FIG. 3. System 400 may include participant devices 411 and 412, counterparty devices 416 and 417, member devices 441 and 442, blockchain network 450, cryptlet fabric 460, enclaves 470, and key vault 465.

In some examples, during normal operation, blockchain network 450 may validate and process submitted blockchain transactions. In some examples, member devices 441 and 442 are devices used by members to communicate with blockchain network 450. In some examples, participant devices 411 and 412 are devices used by participants to communicate with blockchain network 450, such as to request a transaction. In some examples, enclaves 470 are execution environments, provided by hardware or software, that are private, tamper resistant, and secure from external interference. In some examples, outputs from an enclave are digitally signed by the enclave. Key vault 465 may be used to provide secure persistent storage for keys used by cryptlets for identity, digital signature, and encryption services.

In some examples, counterparty devices 416 and 417 are devices used by counterparties or as counterparties to a smart contract that makes use of a contract cryptlet via cryptlet fabric 460. Counterparty devices 416 and 417 may each be, represent, and/or act on behalf of a person, company, IoT device, smart contract, and/or the like, as discussed in greater detail below.

Blockchain network 450 may include a number of VNs. In some examples, each member of blockchain network 450 may, via a member device (e.g., 441 or 442), maintain one or more VNs in blockchain network 450. Participants may request, via participant devices (e.g., 411 or 412) for transactions to be performed by blockchain network 450. During normal operation, VNs in blockchain network 450 validate and process submitted transactions, and execute logic code.

Transactions performed by the blockchain network 450 may be stored in blockchains. In some examples, blockchains are decentralized ledgers that record transactions performed by the blockchain in a verifiable manner. Multiple transactions may be stored in a block. Once a block is full, the block may be capped with a block header that is a hash digest of all of the transaction identifiers within a block. The block header may be recorded as the first transaction in the next block in the chain, thus creating a blockchain.

A blockchain network may also be used for the processing of smart contracts. In some examples, a smart contract is computer code that partially or fully executes and partially or fully enforces an agreement or transaction, such as an exchange of money and/or property, and which may make use of blockchain technology. Rather than running the logic of a smart contract in the blockchain itself, the logic may instead, with assistance from cryptlet fabric 460, be done by cryptlets executing off of the blockchain network 450. In some examples, a cryptlet is a code component that can execute in a secure environment and be communicated with using secure channels. In some examples, cryptlet fabric 460 is configured to provide runtime and other functionality for cryptlets.

In some examples, Cryptlet Fabric 460 a server-less cloud platform that provides core infrastructure for middleware that enables blockchain-based applications with increased functionality. In some examples, Cryptlet Fabric 460 is comprised of several components providing the functionality for an enhanced security envelop of blockchain application into the cloud as well as a common application program interface (API) that abstracts the underlying blockchain and its nuance from developers.

In some examples, Cryptlet Fabric 460 manages scale, failover, caching, monitoring, and/or management of cryptlets, as well as a run time secure key platform for cryptlets that allows for the creation, persistence, and hydration of private keys at scale. ("Hydration" refers to the activation and orchestration in memory from persistent storage.) This allows cryptlets to create, store and use key pairs in a secure execution environment to perform a variety of functions including, for example, digital signatures, ring signatures, zero knowledge proofs, threshold, and homomorphic encryption.

In some examples, a cryptlet may be a software component that inherits from base classes and implements interfaces that provide cryptographic primitives and integrations for distributed trust applications. In some examples, it is sufficient for developers to know the base classes and how to implement required and optional interfaces for cryptlets to develop on the platform. Established software development frameworks, patterns, and designs can be used for user interfaces and integration into existing systems.

Types of cryptlets may include utility cryptlets and contract cryptlets. Utility cryptlets usually perform external data integration via events internal or external, provide data access or reusable logic to blockchain smart contracts, but can also provide service level APIs for other systems to work with blockchains. Utility cryptlets whose primary purpose is to inject attested data into blockchains may be called "oracle" cryptlets. In some examples, contract cryptlets contain smart contract specific logic that counter-parties signing the contract agree to. Both types of cryptlets may provide a blockchain facing API and a Surface level API.

Regardless of how a smart contract is implemented, utility cryptlets may be used to provide information and additional computation for smart contracts in reusable libraries. These libraries may be used to create a framework for building distributed applications and exposed in a common way via the Cryptlet Fabric 460 in both public and private cloud, and in blockchain environments.

Contract cryptlets may redefine the implementation of the logic that a smart contract executes. In some examples, these cryptlets prescribe that any logic be run off-chain, using the underlying blockchain as a database.

Utility cryptlets may provide discrete functionality like providing external information, e.g., market prices, external data from other systems, or proprietary formulas. These may be called "blockchain oracles" in that they can watch and inject "real world" events and data into blockchain systems. Smart contracts may interact with these using a Publish/Subscribe pattern where the utility cryptlet publishes an event for subscribing smart contracts. The event triggers may be external to the blockchain (e.g., a price change) or internal to the blockchain (e.g., a data signal) within a smart contract or operation code.

In some examples, these cryptlets can also be called directly by other cryptlets within the fabric and expose an external or surface level API that other systems can call. For example, an enterprise Customer relationship management (CRM) system may publish an event to a subscribing cryptlet that in turn publishes information to a blockchain in blockchain network 450 based on that information. Bi-directional integration may be provided to smart contracts and blockchains through Cryptlet Fabric 460 in this way.

Contract or control cryptlets may represent the entire logic or state in a contractual agreement between counter parties. In some examples, contract cryptlets used in smart contract-based systems can use the blockchain ledger to authentically store a contract's data using smart contract logic for data validity, but surrogate logic to a contract cryptlet providing "separation of concerns" within an application's design. The relationship between an on-chain smart contract and a contract cryptlet may be called a trust relationship.

For non-smart contract based systems, in some examples, contract cryptlets perform logic and write their data to the blockchain without the smart contract or well-defined schema on the blockchain.

In essence, in some examples, contract cryptlets can run the logic of a contractual agreement between counterparties at scale, in a private secure environment, yet store its data in the underlying blockchain regardless of type.

In some examples, a cryptlet has common properties regardless of type:

Identity—For example, a key pair. The identity can be created by the cryptlet itself or assigned. The public key is also known as the cryptlet address in some examples. The private key may be used to sign all transactions from the cryptlet. Private keys may be stored in the KeyVault 465 or otherwise fetched via secure channel when rehydrating or assigning identity to a cryptlet.

Name—A common name that is mapped to the address for a more readable identity in some examples.

Code—code written in a language that's its Parent Container supports in some examples.

CryptletBindings—a small list of bindings that represent the client (e.g., blockchain contracts or accounts) addresses and parameters for the binding in some examples.

Events—List of events published or watched by the cryptlet in some examples. These event triggers can be watched blockchain data or events or external in some examples.

API—A set of surface level APIs that non-blockchain systems or other cryptlets can use as well as subscriber call back methods in some examples.

Parent Container—A cryptlet container that the cryptlet runs in, in some examples.

Manifest—simple JavaScript Object Notation (JSON) configuration settings for a cryptlet that is used for deployment into the fabric, in some examples.

A cryptlet container may provide a runtime for Cryptlets to execute in. Cryptlet containers may provide abstractions for Cryptlets like I/O, security, key management, and runtime optimization.

Cryptlet containers may provide secure key storage and retrieval for cryptlets to use for identity, digital signatures and encryption. Cryptlets may automatically store and fetch keys via the cryptlet container which integrates with the key vault 465 via a secure channel or CryptletTunnel.

A cryptlet may declare in the manifest its configuration, enclaving, type, etc. In some examples, the cryptlet container ensures that the dependencies the cryptlet needs are in place for it to run.

Enclave requirements for a cryptlet may be set in the cryptlet manifest or in policy. Enclave options and configuration are set in the cryptlet container service, which is part of Cryptlet Fabric 460 in some examples.

In some examples, the cryptlet container service is the hub of the Cryptlet Fabric 460. In some examples, the primary duties and components of the cryptlet container service are:

Cryptlet Fabric Registry, which is the Registry and Database for configuration.

Cryptlets: Name and ID, Surface Level API, and Events they expose to blockchain networks.

Blockchains or other distributed ledgers: Network Name, Type, Node List, metadata.

Smart contracts: on-chain smart contract addresses and application binary interfaces (ABIs) or other interface definition that subscribe to or have trust relationships with Cryptlets as well as the host blockchain network.

CryptletBindings, which is a collection of all bindings the fabric serves. A CryptletBinding may map smart contracts to cryptlets or cryptlets to cryptlets for validation and message routing. A CryptletBinding may represent a single binding between a smart contract and a cryptlet (or pair/ring). Details about the binding like subscription parameter(s), interface parameter(s), and/or smart contract address are used to route messages between cryptlets, their clients, smart contracts, or other cryptlets.

Secure Compute Registry: is a registry of enclaves and their attributes like capabilities, version, costs, and configuration. Enclave pool definitions of clusters and additional cryptographic services provided by Enclave Pools like key derivation, ring signatures, and threshold encryption.

Cryptlet Catalog, which may be a REpresentational State Transfer (REST) API and/or Web Site for developers to discover and enlist cryptlets into their applications either for a smart contract binding or for use in building a user interface or integration.

API for abstracting blockchain transaction formatting and Atomicity, Consistency, Isolation, Durability (ACID) delivery append transactions and read queries from cryptlets and any other system wanting "direct" access to the underlying blockchain. This API can be exposed in various ways, e.g., messaging via service bus, Remote Procedure Calls (RPCs), and/or REST.

Cryptlets, blockchains and smart contracts may get registered with the cryptlet fabric registry service. The cryptlet container service may publish the Cryptlet Catalog for on-chain smart contract, front end user interface (UI) and systems integration developers discover and use cryptlets. Developers using the service level APIs may interact with the blockchain via cryptlets and not be concerned or even necessarily know they are working with blockchain data. User Interfaces and Integrations to other systems may interact with cryptlet surface level APIs to rapidly integrate and build applications.

Enclaves may be hardware or software. For example, a software enclave can be formed by running a hypervisor or Virtual Secure Machine (VSM). An example of a hardware enclave is a secure hardware enclave such as SGX from Intel. A hardware enclave may have a set of keys that are burned/etched onto the silicon than can be used to sign output from the enclave to serve as an attestation to its secure execution. Usually, there is a 1-1 ratio of code and the enclave it runs in. However, in the cloud, cryptlets may be instantiated dynamically and may or may not get the same hardware enclave.

In some examples, enclave resources are pooled together and categorized based on their capabilities. For example, there may be VSM enclaves and hardware enclaves which may have different performance or memory enhancements over time. Cryptlets may be configured to request any enclave or a specific type of enclave and potentially a higher performance hardware enclave at runtime.

In some examples, enclaves are secure execution environments where code can be run in an isolated, private environment and the results of the secure execution can be attested to have been run unaltered and in private. This means that secrets like private keys can be created and used within an enclave to sign transactions and be proved to third parties to have run within an enclave.

In some examples, to deliver cryptlets at scale, enclaves are pooled by the Cryptlet Fabric 460 upon receiving an enclave pool request. In some examples, an enclave pool acts as a resource where, upon receiving an enclave request for a cryptlet, an enclave can be fetched from the enclave pool by Cryptlet Fabric 460 and allocated to a cryptlet at runtime based on the requirements of that cryptlet.

For example, a policy can be set that all cryptlets running a smart contract between counterparty A and B always requires an SGX V2 Enclave from Intel.

Alternatively, the enclave requirement may be left unspecified, so that the least cost (e.g., in terms of money, time, already active, etc.) enclave is provided.

Enclaves 470 are registered within the enclave pool. In some examples, an enclave pool shared signature is generated for the enclave pool, where the enclave pool shared signature is derived from the private key of each enclave in the enclave pool. In some examples, pool management uses just-in-time (JIT) instantiation of enclaves to use them when active, but return them to the pool as soon as the work is done. In some examples, a cryptlet that has an asynchronous lifespan and that will not complete its work can release its enclave at a checkpoint and be re-instantiated in a different enclave. In some examples, switching enclaves produces different attestations that can be validated by the enclave pool shared signature.

In some examples, when a set of enclaves is registered with the Cryptlet Fabric 460, each enclave public key is recorded in the enclave pool registry. In some examples, the characteristics are recorded upon registration and can be modified for pool categories that are not inferred from the hardware. In some examples, once all the enclaves are registered, the keys for all enclaves are used to generate a key pair for the pool which is stored in the Key Vault 465.

At runtime, the CryptletContainerService may determine cryptlets runtime environment dependencies based on its registration or policy and request an enclave out of the enclave pool. The enclave pool may activate an enclave and return its address to the CryptletContainerService, which may then inject the appropriate CryptletContainer. In some examples, the CryptletContainer is provided the cryptlet ID and an active binding, which CryptletContainer uses to fetch the cryptlet binary from secure storage, and run a hash code signature check on the cryptlet, which may be a part of the cryptlet's composite identifier. In some examples, the CryptletContainer then fetches any keys required by the cryptlet from the KeyVault 465 and passes them along with the active cryptlet binding into the constructor of the cryptlet to instantiate it within the enclave. In some examples, cryptlet code executes in the enclave, and the payload is digitally signed by the private key of the enclave.

Once a cryptlet is done with its synchronous work, it may call its checkpoint method which may pass any new keys generated during its session for the CryptletContainer to persist in the Key Vault 465 as well as release the cryptlet's enclave back to the pool. By returning the enclave, the enclave then becomes available again to be used by another cryptlet.

In some examples, if a Cryptlet requires an enclave that is not available and will not be available within a defined call window, an error is logged, and an exception is thrown.

New enclaves may be added to the enclave pool, which will generate a new shared signature for the pool. In some examples, a shared signature is used when a cryptlet's lifetime spans multiple enclaves and continuity of attestation needs to be established. In some examples, the shared signature is historical, so if a cryptlet is attested across multiple enclaves, the shared signature is checked, and if the current signature does not match, the previous version of the signature is checked until a match is found. In these examples, if no match is found, the attestation chain is not valid.

In this way, in these examples, a rogue enclave cannot contribute to a validated transaction. In these examples, if a rogue enclave contributes to a transaction, the shared enclave signature would not be made, and the attestation chain would not be valid.

In some examples, the cryptlet container service has a Blockchain Router that provides the abstraction API for data operations against blockchains. Each different type of blockchain may have a Blockchain Message Provider or Connector that is plugged into the blockchain router for proper message formatting for each blockchain.

In some examples, blockchain connectors have a valid address on each of the blockchains the blockchain connector serves and signs transactions with the key for this address. In some examples, blockchain connectors run within an enclave for transaction-signing purposes.

The Blockchain router depends on CryptletBindings for routing messages to the appropriate blockchain connector. The blockchain connector uses the CryptletBinding information to format the messages correctly and to ensure delivery to the targeted recipient.

In some examples, the cryptlet binding is a data structure that provides the abstraction between the cryptlet and underlying blockchain, smart contracts, and accounts. The cryptlet binding may or may not be secured itself, as it may only contain identifier(s) of bound components (e.g., unique identifier(s)) that authorized parties use to look up details from other services. In some examples, used in routing messages, the binding provides the cryptlet ID and the Smart Contract ID itself. In some examples, the smart contract address is looked up and is bound to a specific Blockchain ID that maps to a node address.

Data may be enveloped in multiple layers of digital attestations (e.g., signatures) signed by the data producer or "on-behalf of" a user or IOT device, cryptlet, its host enclave and, then the blockchain connector. This layering may be referred to as a signature onion.

The CryptoDelegate, which is a portion of cryptlet fabric 460 in some examples, may provide an optimization point for verifying these layered signatures before passing on to be validated by all of the nodes, accordingly reducing redundant signature checks, rejecting invalid attestation chains, and/or freeing compute resources.

Key Vault 465 may provide secure persistent storage of keys used by cryptlets for identity, digital signatures and encryption services. Cryptlet containers may provide abstractions to cryptlets for storing and fetching keys at runtime. In some examples, a secure communication channel, called a CryptletTunnel, is established between the KeyVault 465 and the enclave that is hosting the CryptletContainer. In some examples, storage and retrieval of private keys and secrets used by hosted cryptlets are provided automatically and on demand by the CryptletContainer.

For instance, in some examples, when a cryptlet is instantiated within its CryptletContainer host, if its identity is established by a key pair in the key vault, the CryptletContainer will securely fetch and provide the key pair to the cryptlet upon instantiation. Or, if the cryptlet creates its own or a new key pair, these new keys may be automatically stored by the CryptletContainer when the Cryptlet deactivates. In some examples, the cryptlet can then use the private key to sign transactions and messages for delivery. One example of an assigned key is a cryptlet that signs transactions as a specific counter party, corporation, user, or device, to a Smart Contract with the counter party's private key.

In some examples, cryptlets can request keys or secrets from their container for other cryptographic services like encryption, decryption, and signing of messages. In some examples, keys used by cryptlets, either for identity or other cryptographic purposes, are looked up and located by the CryptletContainer using the CryptletBinding that resolves to either a Cryptlet Instance ID or a CounterpartyId and requesting or storing via the CryptletTunnel to KeyVault 465. In some examples, a CryptletBinding Key Graph is used to record key locations for resolving and locating keys for a different counterparty in a separate Key Vault 465 instance that may be controlled by that counterparty. Key derivation for multiple Cryptlet Identities from a single counterparty may provide multiple concurrence instances to be distinguished. Also, in example scenarios for one-time use key derivation scenarios where Key Vault 465 issues or a cryptlet creates a derived key for cryptlet signing, when the signing is done, the derived key is destroyed as it was only in enclave memory. Key life cycle services such as key expiration and reset may be provided as utilities.

Besides Key Vault 465, a cryptlet tunnel may be established between an enclave and any suitable Hardware Security Module (HSM)—Key Vault 465 is but one example of an HSM to which the enclave may establish a cryptlet tunnel.

In some examples, a cryptlet tunnel is dynamically established between a Hardware Security Module (e.g., Key Vault 465) and an enclave for the purposes of securely transmitting private keys or secrets that are stored in the HSM to the cryptlet running within the enclave. This may also allow cryptlets to create new keys in an enclave and store them to an HSM securely through the tunnel. In some examples, secrets may be exchanged in both directions (enclave to HSM and HSM to enclave). In some examples, the cryptlet tunnel is created at runtime via the enclave and HSM securely sharing session keys to construct a short-lived tunnel for the exchange of these keys for the active cryptlet. In some examples, the keys that are fetched into an enclave via the cryptlet tunnel are only in enclave memory are destroyed when the cryptlet is closed or faulted.

In some examples, an intermediary device may be used in the cryptlet tunnel rather than directly connecting the HSM and the enclave. For instance, in some examples, a host virtual machine of the enclave is used as a broker, in which the host virtual machine brokers the connection for the enclave, although the decryption is still performed in the enclave itself.

In some examples, a user may have a user token that can be passed and mapped to a key in Key Vault 465. When activities associated with the user are performed in an enclave, the user's key may be fetched from Key Vault 465 using a cryptlet tunnel, e.g., in order to sign on behalf of the user using the user's key. Use of the cryptlet tunnel may allow the key to be communicated securely between the enclave and Key Vault 465.

In some examples, once the secure tunnel is in place, the enclave request the cryptlet keychain. The cryptlet keychain may include the key pair for the cryptlet that is used for signing and/or executing the payloads created by the cryptlet. The cryptlet keychain may also include a key pair for any counterparties (e.g., user, IoT device) that the cryptlet can "sign on behalf of"). The cryptlet may also include any secrets defined in the contract binding, such a shared secret between counterparties or a single party such as contract terms that a party or parties do not want visible on the blockchain.

Once the enclave keychain is obtained, the instance of the cryptlet may be provided, and the cryptlet may be provided with the cryptlet's keychain and binding in the constructor or initialization. In some examples, the cryptlet executes the cryptlet code and any output is/can be signed by the private keys in the cryptlet keychain. In some examples, the payload is then handed to the CryptletContainer for the enclave signature to be created around that payload providing the enclave attestation. The signatures may be part of a signature onion. For instance, in some examples, the signature onion may include a signature by the enclave key, a signature by the cryptlet key, a signature by a blockchain-specific key, and a signature of another enclave, resulting in a four-layer signature onion proving a chain of proof with four layers of attestation in these examples.

As discussed above, a cryptlet's lifetime may span multiple enclaves. In some examples, the secure cryptlet tunnel provides a way of persisting secrets across multiple enclaves, in that each enclave can communicate with an HSM that persistently stores the secrets.

A secure tunnel between an HSM and an enclave is discussed in detail above. Such secure tunnels can be established between an enclave and another enclave in the same manner as discussed above between an HSM and an enclave. A secure tunnel between an enclave and another enclave may be used to allow cryptlets to exchange secrets with each other at runtime. Among other applications, this may be used for enclaves in ring and pair topologies for secure communications between enclaves in the topology.

In some examples, developers can construct their smart contracts using objects against their logic and simply persist their object state into the blockchain ledger without having to write a smart contract schema. In some examples, the reverse is also true, and an object model can be built and mapped from an existing smart contract schema. This environment may provide blockchain portability and ease of development for blockchain solutions.

In some examples, the CryptoDelegate is a set of capabilities that are delivered differently based on the underlying blockchain or ledger. In some examples, the CryptoDelegate is part of Cryptlet Fabric 460. In some examples, the CryptoDelegate functions, in essence, as a client-side or node-side integration for the Cryptlet Fabric 460. Among other things, the CryptoDelegate may perform attestation checks on messages before delivery to the underlying node platform, e.g., blocking invalid transactions before they get propagated around blockchain network 450.

As discussed above, when an enclave pool is formed, the enclaves in the pool may be registered with the enclave pool. In some examples, when the enclaves are so registered with Cryptlet Fabric 460, each enclave public key may be received by Cryptlet Fabric 460 and each enclave public key may be recorded in the enclave pool registry. Additionally, as part of the process that occurs when an enclave pool is formed, an enclave pool shared key may be derived from the public key of each enclave in the enclave pool by Cryptlet Fabric 460. A new enclave pool shared key may be generated by Cryptlet Fabric 460 if the membership of the enclave pool changes.

A cryptlet can request an enclave from an associated enclave pool in response to a need. The request may specify a particular size or type of enclave. For example, some types of enclaves are more secure than others, and may be associated with a greater cost, and so an enclave having a particular level of security may be requested according to the particular request. When the request is made, a suitable enclave can be fetched by Cryptlet Fabric 460 from the enclave pool and allocated to the cryptlet based on the particular request.

Cryptlet code that is be executed in an enclave can then be executed in the allocated enclave. As part of the execution of the cryptlet code, the cryptlet code may generate a payload in the host enclave. The payload of the host enclave can then be signed and/or encrypted by the cryptlet private key as well as digitally signed by the private enclave key of the host enclave. The host enclave can then be deallocated from the first cryptlet, so that the cryptlet is no longer running in the enclave, and the enclave is available for other cryptlets. The payload can be attested to out-of-band from the blockchain, e.g., with the public key of the cryptlet and the public key of the enclave.

In some cases, the cryptlet code may also be run in another enclave. For instance, in some examples, as discussed above, pool management may use "just-in-time" (JIT) instantiation of enclaves, but return them to the pool after the work is done. In some examples, a cryptlet that has an asynchronous lifespan and that will not complete its work can deallocate its enclave at a checkpoint.

Accordingly, a different suitable enclave may be fetched from the enclave pool by Cryptlet Fabric 460 and the cryptlet may be re-instantiated in the new enclave. The cryptlet may then continue to execute in the other host enclave (e.g., the new enclave). The payload of the other host enclave can then be digitally signed by the private enclave key of the other host enclave. The other host enclave can then be deallocated so that the cryptlet is no longer running in the enclave, and the other host enclave made available for other cryptlets.

In some examples, the cryptlet may be executed by still more enclaves, such as by at least a third enclave in a similar manner as described above for the second enclave.

Because the cryptlet in this example is executed in more than one enclave, the output of the cryptlet code may contain two or more digital signatures which each originate from the private key of different enclaves from the enclave pool, in addition to a digital signature originating from the private cryptlet key, as well as possibly other digital signatures as part of the signature onion. In some examples, the digital signatures that originate from an enclave key from an enclave that belongs to the enclave pool can all be validated by comparing them against the shared enclave pool key. In some examples, the verification of digital signatures may be performed by the cryptlet fabric.

In some examples, cryptlet code is packaged as a cryptlet that has its own identity that is a composite of multiple components. In some examples, the cryptlet identity is the combination of the binary hash of the compiled cryptlet, the cryptlet public key, and the binding identifier.

In some examples, the cryptlet identity being composed of these three components allows for a single binary to be compiled and reused across many instances of that contract type.

For an example, for a cryptlet binary financial contract that is an Interest Rate Swap, in one example, the Swap cryptlet would have a hash+public key that uniquely represents that cryptlet binary in the fabric. In this example, when a new Interest Rate Swap is created, an instance of that contract is created represented by a binding Id. In some examples, the binding represents the properties/rules of the Swap instance, such as the identities of the counter parties, where the cryptlet gets interest rate pricing from and how often, and/or the like.

In this way, there may be numerous instances of an Interest Rate swap with a single binary cryptlet executing each of these contracts. The unique instance is the composite cryptlet identity that represents the contract in this example.

Accordingly, in some examples, the combination of three components, (1) Binary Hash, (2) Cryptlet Public Key, and (3) Binding Id, is the instance identifier which is then represented as a hash digest for contract that is recorded on the blockchain ledger representing the version of logic controlling the smart contract. This cryptlet identity may be used regardless of whether or not enclave pool is used and regardless of whether or not the shared key is used. In some examples, an instance of a cryptlet consists of the three components (1) Binary Hash, (2) Cryptlet Public Key, and (3) Binding Id, where a general cryptlet that has not been instantiated consists of two components: (1) Binary Hash and (2) Cryptlet Public Key, and where a particular instantiation of that cryptlet would then add the binding Id of that instance of the cryptlet to generate the cryptlet identity for that instance of the cryptlet.

Cryptlets may be installed and registered in cryptlet fabric 460. During the process of installing a cryptlet in fabric 460, cryptlet fabric 460 fetches the cryptlet binary for the cryptlet being installed, and generates a hash of the cryptlet binary. Cryptlet fabric 460 may also request key vault 465 to create a key chain that may include, among other things, a key pair for the cryptlet, where the key pair includes a cryptlet private key and the cryptlet public key, and request that the cryptlet public key be sent to cryptlet fabric 460. Cryptlet fabric 460 may receive the public key and creates a cryptlet identity for the cryptlet, where the cryptlet identity consists of two components (1) the hash of the binary and (2) the cryptlet public key, because the cryptlet is uninstantiated. Cryptlet fabric 460 may register the cryptlet with the cryptlet identity in a cryptlet registry in cryptlet fabric 460, in which the cryptlet identity is stored as an entry in the cryptlet registry as part of the registration. In some examples, the cryptlet registry may act as a kind of catalog from which cryptlets can be selected.

In some examples, when a request for a particular cryptlet is made, and the cryptlet has yet to be instantiated, cryptlet fabric 460 intercepts the request. If the cryptlet will need to execute in a cryptlet, then regardless of whether or not enclave pooling is used, cryptlet fabric 460 may then identify an enclave to be used for executing the cryptlet. The cryptlet fabric 460 may send a cryptlet container to the enclave to be executed in the enclave, and the cryptlet container may fetch the cryptlet key pair for the cryptlet. In some examples, as previously discussed, this is accomplished via a secure channel between Key Vault 465 and the cryptlet container executing in the enclave. Regardless of whether the enclaves are pooled or not, cryptlet fabric 460 may also send the cryptlet binary to the enclave and the cryptlet may begin executing in the enclave.

The cryptlet fabric 460 may then generate the cryptlet binding for the cryptlet and the binding identification associated with the cryptlet binding for the cryptlet. The cryptlet executing in the enclave may output a payload that may be digitally signed by at least the private enclave key of the host enclave, and signed or encrypted by the cryptlet private key. In some examples, cryptlet fabric 460 receives the payload.

Cryptlet fabric 460 may also generate the cryptlet identity, as a combination of the binary hash, the cryptlet public key, and the binding Id. Cryptlet fabric 460 may then generate a hash digest of the cryptlet identity, and cause the hash digest of the cryptlet identity to be provided/communicated to the blockchain ledger in blockchain network 450, where the hash digest may be recorded on the blockchain ledger representing the version of logic controlling the smart contract.

A check may be performed periodically to ensure that the cryptlet identity version is correct, that the signature is correct, and the like. In some examples, it is ensured that the cryptlet is not changed unless all parties agree to the change. In some examples, if all parties agree to a change in a smart contract, the cryptlet identity changes accordingly to an updated version. In some examples, the version of the cryptlet can be checked to ensure that the cryptlet instance was not changed in a manner that was not agreed to by all parties. In these examples, if the cryptlet instance is changed without the change being agreed to by all parties, the cryptlet instance will no longer function.

In some examples, a cryptlet smart contract includes a contract cryptlet, the cryptlet binding of the contract cryptlet, and a smart contract instance stored on a ledger, where the smart contract ledger instance is also indicated in the cryptlet binding of the contract cryptlet. The smart contract ledger instance may be stored on a blockchain such as blockchain network 450, or, instead of being stored on a blockchain, may be stored on another datastore. In some examples, the smart contract ledger instance has a unique public address identified such as "ox9f37b1e1d 82ebcoa163cd45f9fa5b384ea7313e8." The smart contract ledger instance may include the state of the contract as well as other relevant information about the contract, as well as the digital signatures of the identities of the counterparties to the contract. The smart contract ledger instance may include various information from the lifetime of the contract, including information such as payments made, and information such as whether the contract is active, complete, awaiting counterparty signatures, or terminated.

In some examples, a smart contract ledger instance in generated in part from a schema. In some examples, a schema is a smart contract ledger template, which is used to generate a smart contract ledger instance in conjunction with basic information about the contract that needs to be filled in in order to generate the smart contract ledger instance from the template, which may include, for example, the initial seed properties for the smart contract. For instance, for an example smart contract that is a loan agreement, initial seed properties may include, for example, who the lender is, how much money is being borrowed, and/or the like. Subsequent terms of the contract may be determined through later contract negotiation, as discussed in greater detail below.

In some examples, while the smart contract ledger instance includes the state of the smart contract, digital signatures, and other relevant data concerning the smart contract, it is not the complete smart contract because it does not include the smart contract logic. The smart contract logic may be performed by a contract cryptlet for which the cryptlet binding of the contract cryptlet includes a binding that is a mapping to the unique address of the corresponding smart contract ledger instance. In some examples, the cryptlet binding also includes mappings to a set of counterparties to the contract represented as public keys that may be tied to other identity systems. These counterparties can represent two or more people, companies, IoT devices, other smart contracts, and/or the like. The cryptlet binding may also include external sources. For example, the external sources may include one or more utility cryptlets that provide external data that a contract needs for its logic, such as an interest rate or a market price to calculate a payment or fee. A utility cryptlet may be used to present, for example, particular market data and to attest to the value of the presented market data. The cryptlet binding may include data from external sources to be received, as well as, for example, how frequently the external information is to be received.

A cryptlet fabric 460 with installed contract cryptlets may receive a message, e.g. from counterparty device 416 and/or 417, to make a new smart contract.

In some examples, the contract cryptlet may require an enclave. If so, the following may occur in some examples. Cryptlet fabric 460 identifies an enclave to be used for executing the contract cryptlet. Cryptlet fabric 460 sends a cryptlet container to the enclave to be executed in the enclave, and the cryptlet container may fetch the cryptlet key pair for the cryptlet. This may be accomplished via a secure channel between Key Vault 465 and the cryptlet container executing in the enclave. Cryptlet fabric 460 may also send the cryptlet binary for the contract cryptlet to the enclave and the contract cryptlet may begin executing in the enclave.

In other examples, the contract cryptlet does not need an enclave, or may need an enclave at a later time but not for the initial execution of the contract cryptlet. For example, the contract cryptlet may need to execute in an enclave during certain portions of time and not others, the portions of time for which the cryptlet needs to execute in an enclave might not include the initial execution of the contract cryptlet, for instance. In this case, cryptlet fabric 460 causes the contract cryptlet to begin execution. Either way, at this point, in some examples, the contract cryptlet begins execution, either in an enclave or not in an enclave.

After the contract cryptlet begins execution, the contract cryptlet may make a request for information, such as a request for the initial seed properties of the contract. Cryptlet fabric 460 may receive the request, and may send a request to the counterparties (e.g., via counterparty device 416 and/or 417) for the information requested by the contract cryptlet. Cryptlet fabric 460 may then receive the response to the request. Cryptlet fabric 460 may then fetch a schema associated with requested contract. In some examples, cryptlet fabric 460 may already have a stored copy of the schema in cryptlet fabric 460; in other examples, cryptlet fabric 460 requests and receives a copy of the schema from a source external to cryptlet fabric 460.

Based on the information received from the response to the request and the schema, cryptlet fabric 460 may create a smart contract, and then cause a smart contract instance to be deployed on a ledger. In some examples, the ledger is a ledger on blockchain network 450. In other examples, the ledger is a ledger in a datastore that is not part of a blockchain.

After the smart contract ledger is deployed, cryptlet fabric 460 may receive the unique address of the smart contract ledger, where the address acts as the unique identification of the smart contract ledger instance.

Cryptlet fabric 460 may also generate the cryptlet binding, which includes bindings for the contract cryptlet. In some examples, each of these bindings is a mapping between the contract cryptlet and another cryptlet, a smart contract, or an identification of a counterparty to the smart contract. The bindings may be used to route messages between the cryptlet and the other cryptlet or smart contract to which the cryptlet is mapped by the binding. The cryptlet binding may represent the properties and/or rules of the cryptlet. For instance, in an example of a cryptlet that is an interest rate swap, the cryptlet binding may include the identities (public key) of the counterparties to the interest rate swap, where the cryptlet gets interest rate pricing, and how often the cryptlet gets interest rate pricing.

The cryptlet binding may include a binding that is a mapping between the contract cryptlet and the unique address of the smart contract ledger instance, which serves as the unique identification of the smart contract ledger instance. The cryptlet binding may also include a binding for each counterparty that is represented as a public key. The cryptlet binding may include mappings to external sources of data, such as a mapping to a utility cryptlet that provides and attests to market data needed by the logic of the smart contract cryptlet.

Cryptlet fabric 460 may then communicate the cryptlet binding to the contract cryptlet.

Cryptlet fabric 460 may communicate to the smart contract ledger instance to update the smart contract ledger instance when appropriate, such as when there is a state change, or the like. Cryptlet fabric 460 may also instantiate resources for the contract cryptlet and route messages through the system. The contract cryptlet may control the negotiation process for the contract, with terms being updated as they are agreed upon during the negotiation. The communication for the negotiation may occur, for example, between the contract cryptlet and one or more counterparty devices (e.g., 416 and/or 417) via cryptlet fabric 460. In some examples, the smart contract is finalized once all parties digitally sign the smart contract. In some examples, once all parties have digitally signed the smart contract, then the contract binding is completed, and the contract cryptlet begins to run the actual contract logic.

In some examples, after a smart contract is complete, the contract cryptlet instance no longer exists, but the smart contract ledger instance still exists, and it is possible afterwards for an authorized party to review the ledger to obtain historical information about the contract. In some examples, the contract cryptlet does not persistently store its state or any other aspects of the contract; rather, the contract cryptlet uses the smart contract ledger instance to store the state of the contract cryptlet and other smart contract data.

As a non-limiting example, an overview of a process that employs use of a Cryptlet Smart Contract may include:

1. A request for a new contract being made to the cryptlet fabric, which in some cases is made is to a contract cryptlet that is executing in waiting or newly instantiated by the fabric to handle the request to begin the contract creation process.

2. The contract cryptlet takes the new contract request, which include initial seed information required for starting the contract which can be as little or as much information needed for that contract, e.g., contract name, description, first counterparty (e.g., lender), etc.) The contract cryptlet may validate this request and generate a contract constructor message that it sends to the cryptlet fabric. This message may be signed with at least the cryptlet and its enclave signatures. This message may also be signed with the first counterparty's signature. This message may also include the public address(es) in the message for the contract cryptlet and/or any counterparty(-ies) in the constructor message.

3. The cryptlet fabric may validate this request, determine the destination blockchain type, format a blockchain specific transaction, and route this message to the appropriate blockchain. In this example, the transaction flows from the cryptlet fabric, perhaps running in the public or a private cloud to a blockchain node that can be running anywhere.

4. The blockchain node may validate this message, which in some cases may first be validated by the CryptoDelegate that validates the outer layers of the signature onion, e.g., to ensure this transaction message originates from valid and secure source(s), via the enclave and cryptlet signatures. The message may then be sent to the blockchain node for execution. In some cases, a CryptoDelegate is not available and only the blockchain specific signature is checked before sending the message to the node for execution.

5. The blockchain node upon receiving this request for a new contract via a constructor message may then execute the code creating the smart contract instance using the defined schema in the constructor and embedded the public address(es) of the owning cryptlet contract and any counterparty(-ies) in the appropriate places within the schema, e.g., to ensure only the contract cryptlet can update this instance of the contract, and establishes any counterparty(-ies) in their roles within this contract. This smart contract is given a unique identifier, usually a public key, that serves as an address where future messages for interaction can be sent on that blockchain. This address may be returned from the constructor message and passed from the node back to the cryptlet fabric.

6. The cryptlet fabric may receive this address and create a base cryptlet contract binding. In some examples, the binding includes references to the contract cryptlet, the smart contract instance address and any counterparty(-ies) provided in the constructor message.

7. The cryptlet fabric may then provide this binding to the contract cryptlet for it to become active with a new composite identifier, e.g., its binary hash, public address, and the binding identifier. This contract cryptlet may now be bound to service only the binding that it is associated with, and will only be allowed to work with secrets, private keys, for those entities listed in its binding.

8. In some cases, this binding ID is then passed back to the sender of the original new contract request, for example a User Application or perhaps another system. Additional messages sent to the cryptlet fabric referencing this binding ID should be routed to the Contract Cryptlet bound with that ID. In some cases, these additional messages include additional contract details being or to be added, like loan term, amount borrowed, and counterparty agreement (e.g., to the terms of the contract). Each of these messages may be handled by the contract cryptlet, validated, signed, and delivered as state to the underlying smart contract address.

9. In some cases, external data is required for a contract to function, for example, a variable interest rate that can change from month to month. In these cases, a cryptlet fabric may add a utility cryptlet to the contract binding. In some examples, this external data provider portion of the binding includes the identification of the utility cryptlet providing this data, the requirements for receiving this external data like an event: time based, threshold or ad hoc/on demand from the contract cryptlet. In some cases, these external data update rules are recorded in the contract and agreed to by all the counterparties as data regarding the source and circumstances for updates to be accepted. For example, a rule may define that interest rates are to be determined on the 5th day of every month a 4:00 PM EST using the 5 Year Treasury rate+0.10 basis points from source with a name "interest rate source" and a with a particular public key. Once agreed this external data source may be added to the cryptlet binding of the contract cryptlet, and a binding for the utility cryptlet may be created and sent to the utility cryptlet. The utility cryptlet may use its binding rules to trigger data updates to be sent to the contract cryptlet. Any data updates may be signed by the utility cryptlet and its host enclave, e.g., for validation. External data updates provided by utility cryptlets to contract cryptlets may be persisted to the smart contract address with the utility cryptlet signatures along with calculation results from the contract cryptlet with signatures, e.g., to provide proofs and attestations of data validity 10. Once a Cryptlet Binding has a smart contract ledger address, the counterparty signatures and optional external data source(s) defined by it becomes fully operational and can usually execute independently for the full term of the contract, e.g., interacting via messages relevant to its binding. Such messages may be associated with payments, receipts, notifications, etc.

Cryptlets may perform advanced, proprietary, private execution with secrets kept from counterparties, such as private keys or different variable values for counterparties that should not be shared, e.g., terms and prices. In this case, more than one instance of a cryptlet may be used in order to keep secrets (e.g., keys, contract terms) in separate secure address spaces, to provide isolation, and for privacy encryption schemes like ring or threshold encryption schemes for storing shared secrets on the blockchain. Among other things, each counterparty may have its own private user key. In some examples, one of more of the counterparties may have, as secret, negotiating terms of their portion of the smart contract, but the total smart contract can still be determined in aggregate while keeping the negotiating terms of each counterparty secret.

In some examples, cryptlets each running the same logic in a separate enclave that are hosting secrets for a single counterparty in a multi-counterparty smart contract run in a pair for two counterparties or a ring with more than two counterparties. In some examples, the cryptlets running in a pair or a ring perform the same execution logic with different cryptographic keys for signing and/or secret parameters not shared with others.

Many different types of smart contract execution logic can be executed in various examples. Some example may include a financial derivative that is active during market hours, which obtains market data, calculates distributions, and moves balances dynamically.

In some examples, cryptlets in one of these configurations participate in simple consensus processes with a witness providing validation, such as Paxos, a simple 100% match between pairs, and/or the like. In some examples, the witness also acts as a notary. As discussed in greater detail below, in some examples, the witness executes in a separate enclave.

A contract cryptlet typically involves multiple counterparties. In some examples, cryptlet execution paths are used that follow a single counterparty workflow where one counterparty executes a step and signs, releases, and the next counterparty picks up the next step and can use one instance of a cryptlet at a time with each instance fetching the counterparty secrets during that step. This may prevent counterparty secrets from being present in the same enclave.

In some examples, cryptlets are run as shared code in multiple enclaves with each enclave hosting a single counterparty's secrets and signing the counterparty's cryptlet instances output with the counterparty's private key and submitting it to the cryptlet pair/ring witness for validation. In various examples, secrets are not limited to keys for signing or encryption; some of the secrets can be variables as well.

A ring or pair topology may be used in which counterparties execute logic at the same time and synchronously agree on the collective output before persisting the collective output to the underlying database/blockchain. In some examples, a pair or ring will instantiate a cryptlet for each counterparty to synchronously run the shared logic of the cryptlet in the counterparty's own enclave with only that counterparty's secrets. In some examples, the logic is then run, and the output is signed/encrypted/computed with the counterparty's secrets and provided to the witness. In some examples, after the outputs are provided by the enclaves for the counterparties, the counterparty results are validated, as described in greater detail below.

As previously discussed, in a pair or ring topology, enclave-to-enclave secure tunnels may be used to communicate securely between enclaves in the ring or pair.

One example of a process for use with a pair or ring topology of enclaves may proceed as follows. In some examples, prior to the instantiation of any particular cryptlets, cryptlets and cryptlet bindings may be generated for later use in particular instantiations. In some examples, for cryptlets that are used in a pair or ring, the corresponding cryptlet binding for the cryptlet will be configured accordingly to that the cryptlet will properly operates as part of the pair or ring.

In some examples, when a request for a particular cryptlet is made, and the cryptlet has yet to be instantiated, cryptlet fabric 460 intercepts the request. Cryptlet fabric 460 may then fetch a corresponding cryptlet binding for the cryptlet. In some examples, if the cryptlet is to be run in a pair or ring toplogy, then a cryptlet binding that is configured accordingly is fetched. Cryptlet fabric 460 may then determine the requirements and counterparties based on the cryptlet binding. In some examples, cryptlet fabric 460 then identifies and fetches the enclaves—one for each counterparty, and also one for the witness if the cryptlet binding indicates that a witness it to be used. In some examples, cryptlet fabric 460 then sends/injects a cryptlet container to each of the fetched enclaves, and each enclave executes the cryptlet container that was sent to the enclave.

In some examples, the cryptlet containers cause secure tunnels between each enclave and Key Vault 465, and secure tunnels between the enclaves. The cryptlet containers may each securely receive keys and other secrets from Key Vault 465. By providing properly configured cryptlet containers to the enclaves, cryptlet fabric 460 may cause secrets associated with each counterparty to be securely provided to each corresponding enclave.

In some examples, cryptlet fabric 460 provides to each of the enclaves the cryptlet binding. In some examples, cryptlet fabric 460 may send cryptlet binaries to each of the cryptlets. In some examples, each of the cryptlets then executes in the enclave. In some examples, the cryptlet running for each enclave are identical to each other and include identical execution logic, with the difference being only in the secrets of each enclave. In some examples, execution of cryptlets occurs in the manner described above. In some examples, the execution logic is the same for the enclave of each counterparty—the only difference is in secrets, which may include keys. In some examples, the enclave for each counterparty then should provide the same payload as the enclave for each other counterparty, except that, for example, signatures may be different. In some examples, after the enclave for each party generates a payload, the counterparty results are validated. In some examples, the validity of the payloads from each party are validated such that some computed fields need to match or agree, but others do not, such as the sum of some inputs, but the order of the inputs may differ. In some examples, the signatures are also different.

In some examples, the witness is also running in an enclave and validates the counterparty results and determines if consensus is achieved, and if consensus is achieved, the witness sends the signed output to the Cryptlet Fabric 460 for delivery to the data tier. In some examples, a Cryptlet Pair witness simply requires output validation equality and issues re-compute commands to cryptlet payloads that don't validate. In some examples, the witness determines whether the payload of each cryptlet in the ring or pair is the same as each of the other payloads. In some examples, a Cryptlet Ring can use a consensus protocol such as Paxos or the like to achieve consensus. After validation and/or consensus, cryptlet fabric 460 may provide the collective output to the data tier. In some examples, the collective output is then persisted on blockchain network 450.

In some examples, the ring or pair topology allows secure multi-party computing to be performed for blockchains or other shared applications while allowing counterparties to have secrets isolated from each other. In some examples, the counterparties each execute logic at the same time, and synchronously agree on the collective output in the manner described before persisting the collective output to the blockchain.

In some examples, for a cryptlet that is to be used in a ring or a pair topology, the cryptlet binding for the cryptlet is configured accordingly. In some examples, the cryptlet binding for the cryptlet to be used in a ring or pair topology indicates the requirements and the counterparties.

In some examples, ring encryption may be used. In some examples in which ring encryption is used, the private keys of each of the counterparties may be loaded, and a ring signature generated. In some examples, instead of using a witness, ring encryption may be used and the payloads can all be broadcast and processed at substantially the same time.

Examples herein have been given of enclave pair and ring topologies used in conjunction with a blockchain network. However, enclave pair and ring topologies may also be used for cryptlets in other contexts, some of which involve a blockchain network and some of which do not involve a blockchain network. That is, enclave pair and ring topologies may be used in applications that do not involve blockchain networks.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 5A:
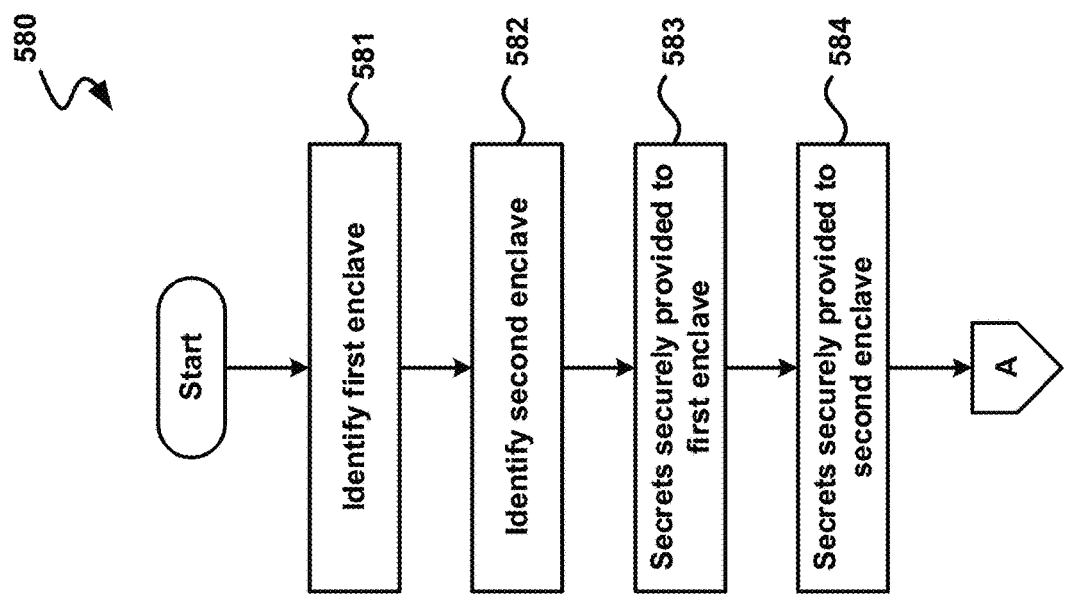
FIGS. 5A-5B are an example dataflow for a process, in accordance with aspects of the present disclosure.
Figure 5B:
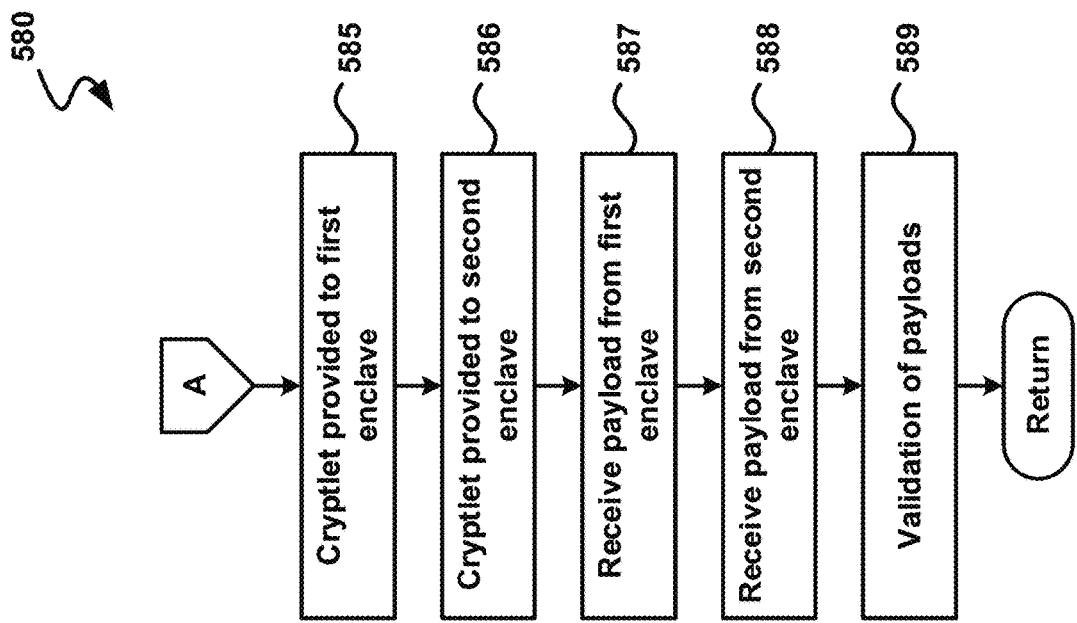

FIGS. 5A-5B are an example dataflow for a process (580). In some examples, process 580 is performed by a cryptlet fabric, e.g., cryptlet fabric 460 of FIG. 4.

In the illustrated example, step 581 occurs first. At step 581, in some examples, a first enclave for use by a first counterparty to a smart contract is identified. As shown, step 582 occurs next in some examples. At step 582, in some examples, a second enclave for use by a second counterparty to a smart contract is identified. As shown, step 583 occurs next in some examples. At step 583, in some examples, secrets associated with the first counterparty are caused to be securely provided to the first enclave. As shown, step 584 occurs next in some examples. At step 584, in some examples, secrets associated with the second counterparty are caused to be securely provided to the second enclave.

As shown, step 585 occurs next in some examples. At step 585, in some examples, a cryptlet is caused to be provided to the first enclave. As shown, step 586 occurs next in some examples. At step 586, in some examples, the cryptlet is caused to be provided to the second enclave. As shown, step 587 occurs next in some examples. At step 587, in some examples, a payload is received from the first enclave. As shown, step 588 occurs next in some examples. At step 588, in some examples, a payload is received from the second enclave. As shown, step 589 occurs next in some examples. At step 589, in some examples, validation is caused to be performed for the plurality of payloads. In some examples, the plurality of payloads includes the payload from the first enclave and the payload from the second enclave.

The process may then proceed to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

I claim:

1. An apparatus, comprising:
a device including at least one memory adapted to store run-time data for the device, and at least one processor that is adapted to execute processor-executable code that, in response to execution, enables the device to perform actions, including:
identifying a first enclave for use by a first counterparty to a smart contract;
identifying a second enclave for use by a second counterparty to the smart contract;
causing secrets associated with the first counterparty to be securely provided to the first enclave;

causing secrets associated with the second counterparty to be securely provided to the second enclave;
causing a cryptlet to be provided to the first enclave;
causing the cryptlet to be provided to the second enclave;
receiving a payload from the first enclave;
receiving a payload from the second enclave; and
causing validation to be performed for a plurality of payloads, wherein the plurality of payloads includes the payload from the first enclave and the payload from the second enclave.

2. The apparatus of claim 1, wherein the validation for the plurality of payloads further includes performing a consensus process.

3. The apparatus of claim 1, wherein the secrets associated with the first counterparty include a private user key for the first counterparty, and wherein the secrets associated with the second counterparty include a private user key for the second counterparty.

4. The apparatus of claim 1, wherein the secrets associated with the first counterparty include at least one contract term.

5. The apparatus of claim 1, the actions further including:
if the validation of the plurality of payloads is unsuccessful, issuing a re-compute command to each enclave for which the payload of the enclave did not validate.

6. The apparatus of claim 1, the actions further including:
identifying a third enclave for use by a third counterparty to a smart contract;
causing secrets associated with the third counterparty to be securely provided to the third enclave;
causing the cryptlet to be provided to the third enclave; and
receiving a payload from the third enclave, wherein the plurality of payloads further includes the payload from the third enclave.

7. The apparatus of claim 6, wherein each payload of the plurality of payloads is encrypted with a ring signature.

8. The apparatus of claim 6, the actions further including:
fetching a cryptlet binding for the first enclave, wherein the cryptlet binding is configured for a ring topology of enclaves;
fetching a cryptlet binding for the second enclave, wherein the cryptlet binding is configured for a ring topology of enclaves; and
fetching a cryptlet binding for the third enclave, wherein the cryptlet binding is configured for a ring topology of enclaves.

9. A method, comprising:
causing secrets associated with a first counterparty to a smart contract to be securely sent to a first enclave;
causing secrets associated with a second counterparty to the smart contract to be securely sent to a second enclave;
causing a cryptlet to be provided to the first enclave;
causing the cryptlet to be provided to the second enclave; and
causing validation to be performed for a plurality of payloads, wherein the plurality of payloads includes a payload provided by a first enclave and a payload provided by a second enclave.

10. The method of claim 9, wherein the validation for the plurality of payloads further includes performing a consensus process.

11. The method of claim 9, wherein the secrets associated with the first counterparty include a private user key for the first counterparty, and wherein the secrets associated with the second counterparty include a private user key for the second counterparty.

12. The method of claim 9, further comprising:
causing secrets associated with the third counterparty to be securely sent to a third enclave; and
causing the cryptlet to be provided to the third enclave, wherein the plurality of payloads further includes the payload from the third enclave.

13. The apparatus of claim 12, wherein each payload of the plurality of payloads is encrypted with a ring signature.

14. The method of claim 12, further comprising:
fetching a cryptlet binding for the first enclave, wherein the cryptlet binding is configured for a ring topology of enclaves;
fetching a cryptlet binding for the second enclave, wherein the cryptlet binding is configured for a ring topology of enclaves; and
fetching a cryptlet binding for the third enclave, wherein the cryptlet binding is configured for a ring topology of enclaves.

15. A processor-readable storage medium, having stored thereon processor-executable code that, upon execution by at least one processor, enables actions, comprising:
causing secret information associated with a first counterparty to be securely provided to a first enclave;
causing secret information associated with a second counterparty to be securely provided to a second enclave;
causing a cryptlet to be sent to the first enclave;
causing the cryptlet to be sent to the second enclave such that execution logic performed by the first enclave is identical to execution logic performed by the second enclave; and
causing validation to be performed for a plurality of payloads, wherein the plurality of payloads includes a payload provided by a first enclave and a payload provided by a second enclave.

16. The processor-readable storage medium of claim 15, wherein the validation for the plurality of payloads further includes performing a consensus process.

17. The processor-readable storage medium of claim 15, wherein the secret information associated with the first counterparty includes a private user key for the first counterparty, and wherein the secret information associated with the second counterparty includes a private user key for the second counterparty.

18. The processor-readable storage medium of claim 15, the actions further comprising:
causing secret information associated with the third counterparty to be securely provided to the third enclave;
causing the cryptlet to be provided to the third enclave, wherein the plurality of payloads further includes the payload from the third enclave.

19. The processor-readable storage medium of claim 18, wherein each payload of the plurality of payloads is encrypted with a ring signature.

20. The processor-readable storage medium of claim 18, the actions further comprising:
fetching a cryptlet binding for the first enclave, wherein the cryptlet binding is configured for a ring topology of enclaves;
fetching a cryptlet binding for the second enclave, wherein the cryptlet binding is configured for a ring topology of enclaves; and fetching a cryptlet binding for the third enclave, wherein the cryptlet binding is configured for a ring topology of enclaves.

\* \* \* \* \*